R. F. Loper.
Building
No. 73.
4,178.
Reissued May 7, 1861.
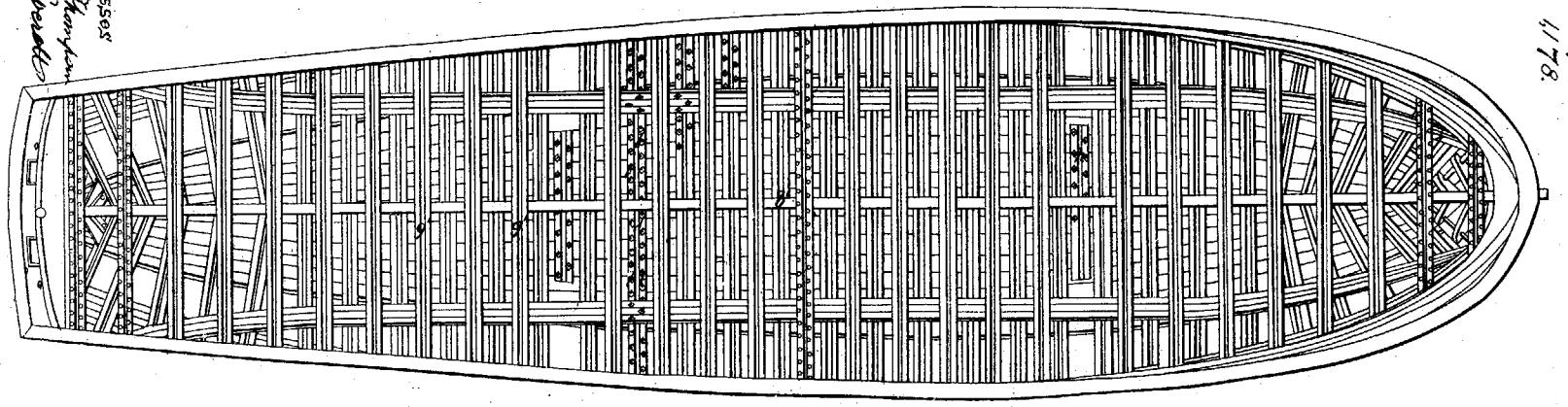
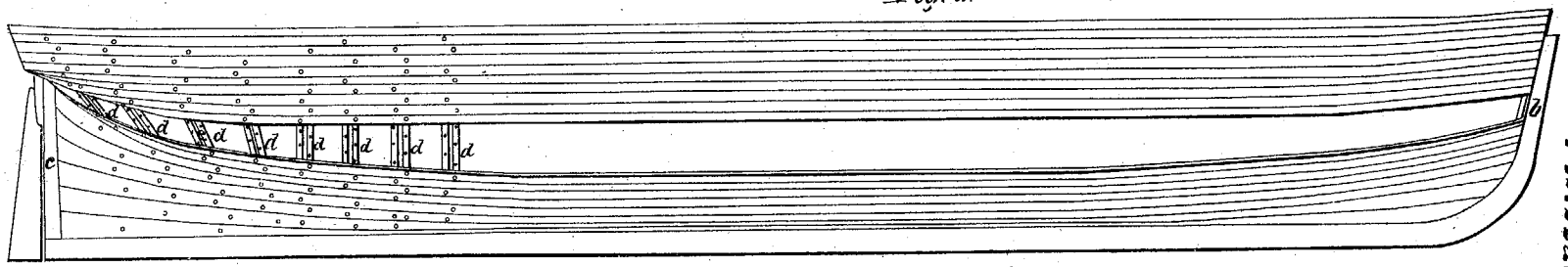
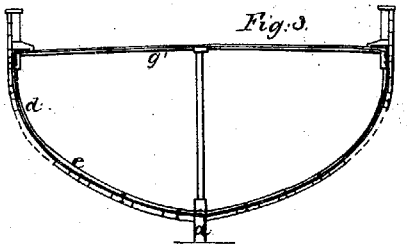
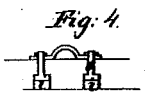
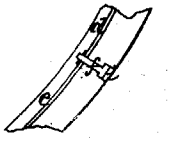
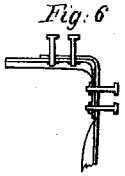
Witnesses
R. D. Thompson
R. J. Everett
Inventor
R. F. Loper
by Atty Thos. T. Everett
N. PETERS, PHOTO-LITHOGRAPHER, WASHINGTON, D. C.

UNITED STATES PATENT OFFICE.

RICHARD F. LOPER, OF PHILADELPHIA, PENNSYLVANIA.

IMPROVEMENT IN SHIP-BUILDING.

Specification forming part of Letters Patent No. 5,368, dated November 13, 1847; Reissue No. 1,178, dated May 7, 1861.

*To all whom it may concern:*

Be it known that I, RICHARD F. LOPER, of the city and county of Philadelphia, in the State of Pennsylvania, have invented a new and useful Method of Constructing Ships and other Vessels of Metal and Wood; and I do hereby declare that the following is a full, clear, and exact description of the principle or character of my invention, which distinguishes it from all other things before known, and of the manner of of making, constructing, and using the same, reference being had to the accompanying drawings, making part of this specification, in which—

Figure 1 is a plan of a vessel constructed in accordance with my improved method; Fig. 2, a side elevation, and Fig. 3 a cross vertical section of the same.

The same letters indicate like parts in all the figures.

The nature of my invention consists in constructing the frames of ships and other vessels of metal ribs of hollow forms connected together by bolting to them the wooden ceiling, the keel and stem, and stern-posts, whereby I am enabled to make a vessel of greater strength with a given weight than can be attained by means of wood alone, and prevent the corrosion which takes place when the outside of a vessel is made of iron.

In the accompanying drawings, *a* represents the keel; *b* the stem, and *c* the stern-post, made of wood, and of the usual construction; and to the inner surface of these is bolted a plate of metal, *b'*, having a bead or recess in the middle of its width and extending the whole length, the bead being let into the wood. This metal plate can be in one single piece from end to end, or spliced with lap-joints connected together by the same bolts, which secure the metal to the wood. The frame is composed of ribs *d*, which take the place of what are called the "timbers," in the usual mode of construction. They are made of bars of plate metal rolled, with a raised bead or arch, *e*, on one face and a corresponding recess on the other, extending the whole length of the bar for the purpose of giving stiffness. This is shown on an enlarged scale at Figs. 4 and 5. They are bent in the form of a cross-section of the vessel, and provided with a row of holes on each side of the bead, through which screw-bolts *f* pass to secure them to the keel. The heads of the bolts, which are outside, are let into the wood a sufficient distance to admit of driving in a wooden plug, *i*, with good cement, to prevent the access of water to the bolt-heads. This is shown in Fig. 5. The ceiling is then secured to these metal ribs by means of screw-bolts in the same manner as the keel, and the bolt-heads are in like manner protected from the action of the water. When the frame has been thus secured together and further bound by the attachment of the ceiling, the outside boards can be put on in the usual manner, thus constituting a vessel having more strength for a given weight than has been attained by any other known means, while the metal is entirely protected from the corrosive action of the water. The attachment of the wood to the iron ribs or metal bars by means of the screw-bolts will make liquid-proof joints, so that the channel formed by the bead and the wood attached thereto can be filled with oil as a further protection against corrosion, and the joints may be further protected against leakage by painting or any other known means. For the purpose of securing the deck-beams *g* the rib-bars are bent to the proper angle, and the beams, whether of wood or of metal, bolted to them. It will be obvious that the bead rolled on the rib can be of any desired form, although I prefer one semicircular in its cross-section, and that the ribs and other pieces can be of the forms represented by cross-section *v* on the drawings, or of any form that may be regarded as useful or convenient. The ribs may be made to extend in a single piece from gunwale to gunwale, or in two parts, with a lap-joint secured to the keel and to the keelson; and as a means of giving strength to the frame intermediate short ribs, *h*, may be secured to the keel and keelson and placed between the main ribs and extending up on each side sufficiently high to give the requisite strength to the bottom of the vessel. Instead of deck-timbers secured to the bent ends of the ribs, as stated above, I propose to substitute bars *g'*, prepared in like manner as the ribs, and connected with them by lap-joints, as represented in the separate section Fig. 6, and then the deck-boards are to be secured to these bars in the same manner as a ceiling is to the ribs.

What I claim as my invention, and desire to secure by Letters Patent, is—

Constructing ships and other vessels by combining iron hollow forms of ribs or timbers with wooden sides, bottom, keel, stem, and stern-posts, substantially as described.

This specification signed this 1st day of March, 1861.

R. F. LOPER.

Witnesses:
T. T. EVERETT,
F. S. MYER.